(12) United States Patent
Shi et al.

(10) Patent No.: US 12,434,445 B2
(45) Date of Patent: Oct. 7, 2025

(54) METHODS FOR JOINING A FIRST THERMOPLASTIC SUBSTRATE WITH A SECOND THERMOPLASTIC SUBSTRATE

(71) Applicant: The Boeing Company, Chicago, IL (US)

(72) Inventors: Ying Shi, Saint Louis, MO (US); Alexander M. Rubin, St. Louis, MO (US); Gregory J. Hickman, University City, MO (US)

(73) Assignee: The Boeing Company, Arlington, VA (US)

( * ) Notice: Subject to any disclaimer, the term of this patent is extended or adjusted under 35 U.S.C. 154(b) by 58 days.

(21) Appl. No.: 17/590,879

(22) Filed: Feb. 2, 2022

(65) Prior Publication Data

US 2022/0266541 A1 Aug. 25, 2022

Related U.S. Application Data

(60) Provisional application No. 63/152,922, filed on Feb. 24, 2021.

(51) Int. Cl.
*B29C 65/00* (2006.01)
*B29C 65/02* (2006.01)
(Continued)

(52) U.S. Cl.
CPC ........ *B29C 66/73116* (2013.01); *B29C 65/02* (2013.01); *B29C 66/73921* (2013.01);
(Continued)

(58) Field of Classification Search
CPC ............... B29C 65/02; B29C 66/73116; B29C 66/73921; B29C 66/73774;
(Continued)

(56) References Cited

U.S. PATENT DOCUMENTS 5,066,536 A 11/1991 Cogswell et al.
8,158,245 B2 * 4/2012 Pratte ...................... B29C 70/88
427/407.1
(Continued)

FOREIGN PATENT DOCUMENTS

WO WO 2014/088704 6/2014

OTHER PUBLICATIONS

European Patent Office, Extended European Search Report, App. No. 21211932.5 (Jun. 9, 2022).
(Continued)

*Primary Examiner* — John L Goff, II
(74) *Attorney, Agent, or Firm* — Walters & Wasylyna LLC (57) ABSTRACT

A method for joining a first thermoplastic substrate and a second thermoplastic substrate, each including a polyaryletherketone material having a first melting temperature. The method includes co-consolidating a first semicrystalline thermoplastic film with the first thermoplastic substrate to yield a first co-consolidated structure. The first semicrystalline thermoplastic film defines a first bonding surface of the first co-consolidated structure and includes a polyaryletherketone material having a second melting temperature that is less than the first melting temperature. The method further includes co-consolidating a second semicrystalline thermoplastic film with the second thermoplastic substrate to yield a second co-consolidated structure. The second semicrystalline thermoplastic film defines a second bonding surface of the second co-consolidated structure and includes a polyaryletherketone material having a third melting temperature that is less than the first melting temperature. The
(Continued)

method further includes fusing the first bonding surface to the second bonding surface. The method yields a stacked structure.

24 Claims, 4 Drawing Sheets

(51) Int. Cl.
```
B32B 27/08      (2006.01)
B32B 27/28      (2006.01)
B32B 37/04      (2006.01)
B32B 37/10      (2006.01)
B32B 37/18      (2006.01)
B29K 71/00      (2006.01)
```
(52) U.S. Cl.
CPC ............ *B32B 27/08* (2013.01); *B32B 27/285* (2013.01); *B32B 27/288* (2013.01); *B32B 37/04* (2013.01); *B32B 37/10* (2013.01); *B32B 37/182* (2013.01); *B29K 2071/00* (2013.01); *B29K 2995/004* (2013.01); *B32B 2309/02* (2013.01); *B32B 2309/12* (2013.01); *B32B 2371/00* (2013.01)

(58) Field of Classification Search
CPC .......... B29C 66/8266; B29C 66/81455; B29K 2071/00; B29K 2995/004; B32B 37/04; B32B 37/10; B32B 37/182; B32B 2309/02; B32B 2309/12; B32B 2371/00
USPC ........................................................ 156/182
See application file for complete search history.

(56) References Cited

U.S. PATENT DOCUMENTS

| | | | |
|---|---|---|---|
| 2005/0026723 A1* | 2/2005 | Kumamoto | ........ A63B 53/0466 473/345 |
| 2010/0170637 A1 | 7/2010 | Iannone | |
| 2015/0298388 A1 | 10/2015 | Wong et al. | |

OTHER PUBLICATIONS

Smiley et al.: "Dual polymer bonding of thermoplastic composite structures," Polymer Engineering & Science (Apr. 1991).

* cited by examiner

METHODS FOR JOINING A FIRST THERMOPLASTIC SUBSTRATE WITH A SECOND THERMOPLASTIC SUBSTRATE

PRIORITY

This application claims priority from U.S. Ser. No. 63/152,922 filed on Feb. 24, 2021.

FIELD

This application relates to the joining of composite parts and, more specifically, to joining two or more thermoplastic parts by film fusion and the resulting stacked structures therefrom.

BACKGROUND

Joining thermoplastic to thermoplastic composites typically requires the use of fasteners. The inert nature of thermoplastic polymers, meaning the nonreactive nature of the thermoplastic polymer within composite material, makes joining without fasteners difficult. Joining without fasteners typically requires the composite surface to be subjected to extensive treatment prior to adhesive bonding (e.g., by plasma etching or by aggressive sanding). These treatments are both costly and time consuming. Another challenge with joining thermoplastic to thermoplastic composites is finding joining materials that are compatible at the molecular level with the thermoplastic polymer in the composite material. Finally, differences in the melting temperatures may result in compromising the mechanical properties of the composite parts if the joining temperature surpasses the melting temperature of the composite parts.

Film joining processes have been explored in the past. However, the joining films are typically amorphous polymers, which are susceptible to solvents and lack creep resistance under load.

Accordingly, those skilled in the art continue with research and development efforts in the field of joining two or more parts having thermoplastic material.

SUMMARY

Disclosed are methods for joining a first thermoplastic substrate with a second thermoplastic substrate. The first thermoplastic substrate and the second thermoplastic substrate include a polyaryletherketone material having a first melting temperature.

In one example, the disclosed method includes co-consolidating a first semicrystalline thermoplastic film with the first thermoplastic substrate to yield a first co-consolidated structure. The first semicrystalline thermoplastic film includes a polyaryletherketone material having a second melting temperature. The second melting temperature is less than the first melting temperature. The first semicrystalline thermoplastic film defines a first bonding surface of the first co-consolidated structure. The method further includes co-consolidating a second semicrystalline thermoplastic film with the second thermoplastic substrate to yield a second co-consolidated structure. The second semicrystalline thermoplastic film includes a polyaryletherketone material having a third melting temperature that is less than the first melting temperature. The second semicrystalline thermoplastic film defines a second bonding surface of the second co-consolidated structure. The method further includes fusing the first bonding surface of the first co-consolidated structure to the second bonding surface of the second co-consolidated structure.

Also disclosed is a stacked structure.

In one example, the stacked structure includes a first co-consolidated structure. The first co-consolidated structure has a first thermoplastic substrate comprising a polyaryletherketone material. The first thermoplastic substrate has a first melting temperature. The first co-consolidated structure further includes a first semicrystalline thermoplastic film comprising a polyaryletherketone material. The first semicrystalline thermoplastic film has a second melting temperature that is less than the first melting temperature. The first semicrystalline thermoplastic film defines a first bonding surface of the first co-consolidated structure. The stacked structure further includes a second co-consolidated structure. The second co-consolidated structure has a second thermoplastic substrate comprising a polyaryletherketone material. The second thermoplastic substrate has a first melting temperature. The second co-consolidated structure further includes a second semicrystalline thermoplastic film comprising a polyaryletherketone material. The second semicrystalline thermoplastic film has a third melting temperature that is less than the first melting temperature. The second semicrystalline thermoplastic film defines a second bonding surface of the second co-consolidated structure.

Other examples of the disclosed methods for joining a first thermoplastic substrate with a second thermoplastic substrate will become apparent from the following detailed description, the accompanying drawings and the appended claims.

DETAILED DESCRIPTION

Disclosed is a method for joining a first thermoplastic substrate with a second thermoplastic substrate via film fusion with an interlayer polymer film to yield a stacked structure. The interlayer polymer film has a lower transition temperature such that the interlayer polymer film can diffuse and join the composite substrates before deconsolidation (softening/melting) of each composite substrate. This method allows for joining thermoplastic substrates and facilitating molecular diffusion without the use of fasteners. Further, the method protects the material properties such that they are not sacrificed during the joining process.

In one example, the interlayer polymer film is a semicrystalline film belonging to the family of polyaryletherketone (PAEK) polymers. The joining processing window was determined by mechanical testing of pull off coupons joined at various conditions. The joining robustness was validated using double lap shear and double cantilever beam tests. This joining process then was demonstrated on a thermoplastic skin stringer assembly. Without sophisticated and expensive tooling requirements and with minimum surface preparation, the joining method yields potential for manufacturing structural composite components assemblies at lower costs.

Figure 1:
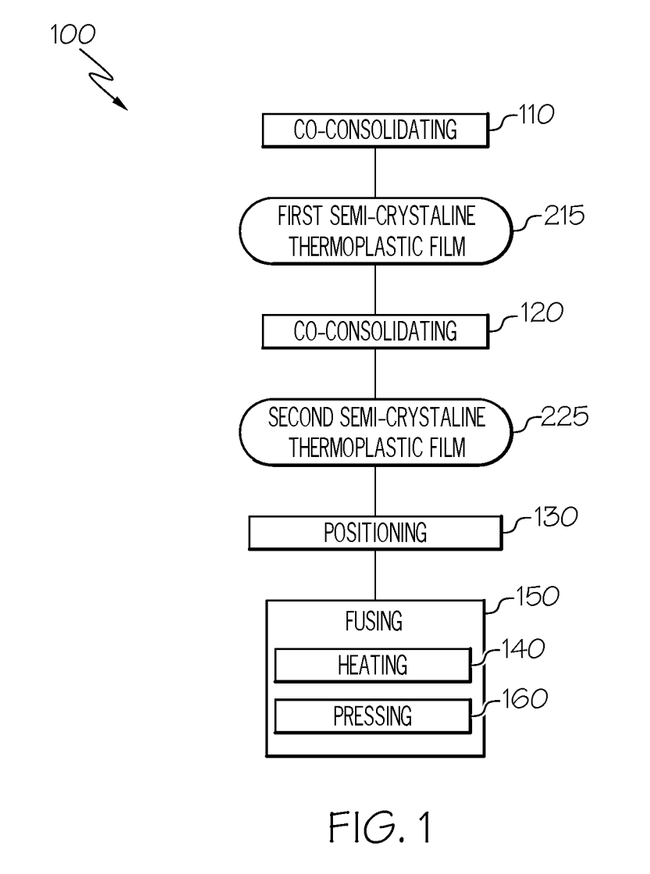
FIG. 1 is a block diagram of a method for joining composite parts.
Figure 2A:
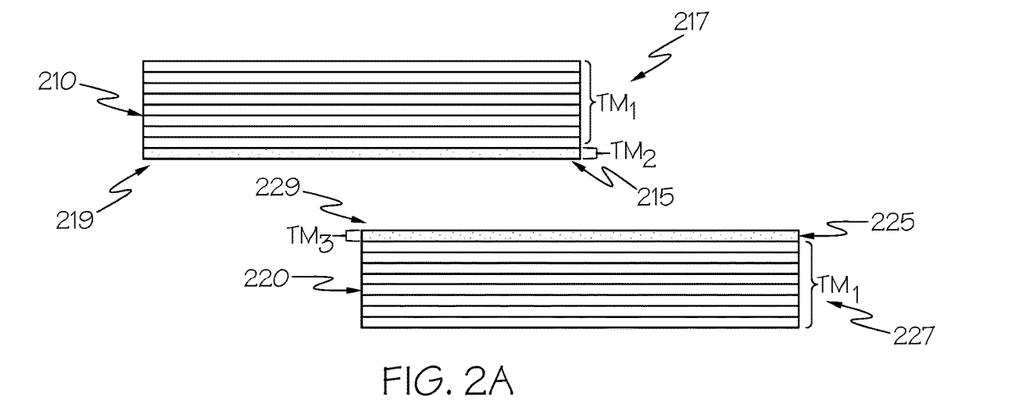
FIG. 2A is a schematic of two composite parts.
Figure 2B:
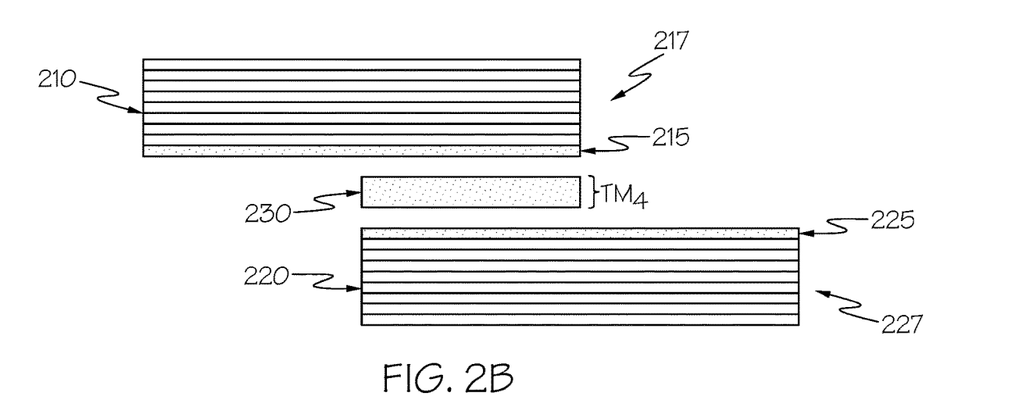
FIG. 2B is a schematic of two composite parts and an intermediary thermoplastic film.
Figure 2C:
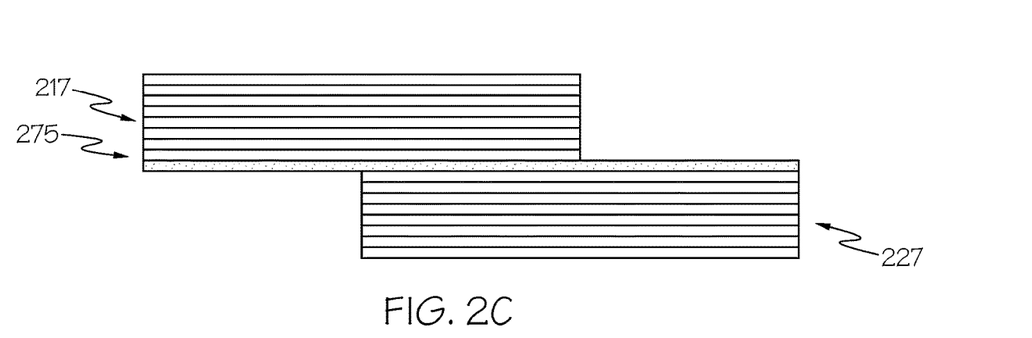
FIG. 2C is a schematic of a stacked structure of the two composite parts of FIG. 2A.

Disclosed is a method 100, see FIG. 1, for joining a first thermoplastic substrate 210 with a second thermoplastic substrate 220, see FIG. 2A, to yield a stacked structure 275, see FIG. 2C. In one or more examples, the first thermoplastic substrate 210 and the second thermoplastic substrate 220 have substantially the same melting temperature. In one example, the first thermoplastic substrate 210 comprises a polyaryletherketone material having a first melting temperature $T_{M1}$. In one or more examples, the first thermoplastic substrate 210 comprises polyether ketone ketone. In another example, the first thermoplastic substrate 210 comprises polyether ether ketone. In one or more examples, the first thermoplastic substrate 210 comprises a polyaryletherketone blend.

In one or more examples, the second thermoplastic substrate 220 comprises a polyaryletherketone material having a first melting temperature $T_{M1}$. In one or more examples, the second thermoplastic substrate 220 comprises polyether ketone ketone. In one example, the second thermoplastic substrate 220 comprises polyether ether ketone. In one or more examples, the second thermoplastic substrate 220 comprises a polyaryletherketone blend. In another example, the first thermoplastic substrate 210 and the second thermoplastic substrate 220 comprise the same polyaryletherketone material. In yet another example, the first thermoplastic substrate 210 and the second thermoplastic substrate 220 comprise different polyaryletherketone materials.

FIG. 2A illustrates an example of the first thermoplastic substrate 210 and the second thermoplastic substrate 220 prior to joining. In one or more examples, the method 100 comprises co-consolidating 110, FIG. 1, a first semicrystalline thermoplastic film 215 with the first thermoplastic substrate 210 to yield a first co-consolidated structure 217. In one example, the first semicrystalline thermoplastic film 215 comprises a polyaryletherketone material having a second melting temperature $T_{M2}$. In another example, the second melting temperature $T_{M2}$ is less than the first melting temperature $T_{M1}$. In one or more examples, the first semicrystalline thermoplastic film 215 comprises polyether ketone ketone. In one or more examples, the first semicrystalline thermoplastic film 215 comprises polyether ether ketone. In yet another, the first semicrystalline thermoplastic film 215 comprises a polyaryletherketone blend.

In one or more examples, the first semicrystalline thermoplastic film 215 defines a first bonding surface 219 of the first co-consolidated structure 217. In one example, the first co-consolidated structure 217 has a first co-consolidating temperature $T_1$. The first co-consolidating temperature $T_1$ defines the temperature upon which co-consolidating 110 occurs along the first bonding surface 219 to yield the first co-consolidated structure 217. In one or more examples, the first co-consolidating temperature $T_1$ is greater than the first melting temperature $T_{M1}$. In another example, the co-consolidating 110 the first semicrystalline thermoplastic film 215 with the first thermoplastic substrate 210 is performed at a first co-consolidation temperature $T_1$ between about 300° C. and about 421° C.

In one or more examples, the method 100 comprises co-consolidating 120 a second semicrystalline thermoplastic film 225 with the second thermoplastic substrate 220 to yield a second co-consolidated structure 227, see FIG. 2B. In one or more examples, the second semicrystalline thermoplastic film 225 comprises a polyaryletherketone material having a third melting temperature $T_{M3}$. In one or more examples, the third melting temperature $T_{M3}$ is less than the first melting temperature $T_{M1}$. In one or more examples, the third melting temperature $T_{M3}$ is substantially the same as the second melting temperature $T_{M2}$.

In one or more examples, the second semicrystalline thermoplastic film 225 comprises polyether ketone ketone. In one or more examples, the second semicrystalline thermoplastic film 225 comprises polyether ether ketone. In one or more examples, the second semicrystalline thermoplastic film 225 comprises a polyaryletherketone blend. In one or more examples, the first semicrystalline thermoplastic film 215 and the second semicrystalline thermoplastic film 225 comprise the same polyaryletherketone material.

Referring to FIG. 2A, in one or more examples, the second semicrystalline thermoplastic film 225 defines a second bonding surface 229 of the second co-consolidated structure 227. In or more examples, the second co-consolidated structure 227 has a second co-consolidating temperature $T_2$. The second co-consolidating temperature $T_2$ defines the temperature upon which co-consolidating 120 occurs along the second bonding surface 229 to yield the second co-consolidated structure 227. In one or more examples, the second co-consolidating temperature $T_2$ is greater than the first melting temperature $T_{M1}$. In another example, the second co-consolidating temperature $T_2$ is substantially the same as the first co-consolidating temperature $T_1$. In one example, the second co-consolidating temperature $T_2$ is less than the first co-consolidating temperature $T_1$. In another example, the second co-consolidating temperature $T_2$ is greater than the first co-consolidating temperature $T_1$. In yet another example, the co-consolidating 120 the second semicrystalline thermoplastic film 225 with the second thermoplastic substrate 220 is performed at second co-consolidating temperature $T_2$ between about 300° C. and about 421° C.

As illustrated in FIG. 2A, the first thermoplastic substrate 210 and the second thermoplastic substrate 220 have a first melting temperature $T_{M1}$, the first semicrystalline thermoplastic film 215 has a second melting temperature $T_{M2}$, and the second semicrystalline thermoplastic film 225 has a third melting temperature $T_{M3}$. In one or more examples, the difference between the first melting temperature $T_{M1}$ and the second melting temperature $T_{M2}$ is at least 20° C. In one or more examples, the difference between the first melting temperature $T_{M1}$ and the second melting temperature $T_{M2}$ is at least 25° C. In one or more examples, the difference between the first melting temperature $T_{M1}$ and the second melting temperature $T_{M2}$ is at least 30° C. In one or more examples, the difference between the first melting temperature $T_{M1}$ and the second melting temperature $T_{M2}$ is at least 35° C. In one or more examples, the difference between the first melting temperature $T_{M1}$ and the second melting temperature $T_{M2}$ is at least 40° C. In one or more examples, the difference between the first melting temperature $T_{M1}$ and the second melting temperature $T_{M2}$ is greater than 40° C.

As illustrated in FIG. 2A, the first thermoplastic substrate 210 and the second thermoplastic substrate 220 have a first melting temperature $T_{M1}$, the first semicrystalline thermoplastic film 215 has a second melting temperature $T_{M2}$, and the second semicrystalline thermoplastic film 225 has a third melting temperature $T_{M3}$. In one or more examples, the difference between the first melting temperature $T_{M1}$ and the third melting temperature $T_{M3}$ is at least 10° C. In one or more examples, the difference between the first melting temperature $T_{M1}$ and the third melting temperature $T_{M3}$ is at least 15° C. In another example, the difference between the first melting temperature $T_{M1}$ and the third melting temperature $T_{M3}$ is at least 20° C. In another example, the difference between the first melting temperature $T_{M1}$ and the third melting temperature $T_{M3}$ is at least 25° C. In another example, the difference between the first melting temperature $T_{M1}$ and the third melting temperature $T_{M3}$ is at least 30° C. In another example, the difference between the first melting temperature $T_{M1}$ and the third melting temperature $T_{M3}$ is at least 35° C. In another example, the difference between the first melting temperature $T_{M1}$ and the third melting temperature $T_{M3}$ is at least 40° C. In yet another example, the difference between the first melting temperature $T_{M1}$ and the third melting temperature $T_{M3}$ is greater than 40° C.

Referring to FIG. 1, in one or more examples, the method 100 comprises fusing 150 the first bonding surface 219 of the first co-consolidated structure 217 to the second bonding surface 229 of the second co-consolidated structure 227 to yield a stacked structure 275, see FIG. 2C. In one or more examples, the first semicrystalline thermoplastic film 215 of the first bonding surface 219 is miscible with the second semicrystalline thermoplastic film 225 of the second bonding surface 229. In one or more examples, the fusing 150 comprises heating 140 the first co-consolidated structure 217 and the second co-consolidated structure 227. In one or more examples, the heating 140 comprises any suitable means of heating, including conduction heating, convection heating, induction heating, and the like.

Referring to FIG. 1, in one or more examples, the heating 140 comprises heating 140 the first co-consolidated structure 217 and the second co-consolidated structure 227 to a joining temperature for joining the entire assembly, wherein the joining temperature is greater than the second melting temperature $T_{M2}$ and the third melting temperature $T_{M3}$. In one or more examples, the joining temperature is less than the first melting temperature $T_{M1}$. In another example, the fusing 150 is performed at a temperature between about 260° C. and about 350° C. In yet another example, the fusing 150 is performed at a temperature between about 299° C. and about 350° C.

Referring to FIG. 1, in one or more examples, the fusing 150 further comprises pressing 160 the first bonding surface 219 of the first co-consolidated structure 217 into engagement with the second bonding surface 229 of the second co-consolidated structure 227. In one or more examples, the fusing 150 comprises applying pressure to the first thermoplastic substrate 210 and/or to the second thermoplastic substrate 220. In one or more examples, the fusing 150 comprises applying pressure with an inflatable bladder. In one or more examples, the fusing 150 comprises applying pressure with the inflatable bladder at about 14 psi to about 60 psi. In one or more examples, the fusing 150 comprises applying pressure via any suitable means including vacuum pressure, a heated press, an autoclave, a pressure vessel, or the like.

FIG. 2B illustrates an example of the first co-consolidated structure 217 and the second co-consolidated structure 227 having a third semicrystalline thermoplastic film 230 disposed between. Referring to FIG. 1, in one or more examples, the method 100 comprises, prior to the fusing 150, positioning 130 a third semicrystalline thermoplastic film 230 between and in contact with both the first bonding surface 219 of the first co-consolidated structure 217 and the second bonding surface 229 of the second co-consolidated structure 227. In one or more examples, the third semicrystalline thermoplastic film 230 comprises a polyaryletherketone material having a fourth melting temperature $T_{M4}$.

In one or more examples, the third semicrystalline thermoplastic film 230 comprises polyether ketone ketone. In one or more examples, the third semicrystalline thermoplastic film 230 comprises polyether ether ketone. In one or more examples, the third semicrystalline thermoplastic film 230 comprises a polyaryletherketone blend. In one or more examples, the third semicrystalline thermoplastic film 230 comprises a blend of polyether ketone ketone and polyether ether ketone. In one or more examples, the fourth melting temperature $T_{M4}$ is substantially the same as the second melting temperature $T_{M2}$ and the third melting temperature $T_{M3}$.

The semicrystalline nature of the first semicrystalline thermoplastic film, the second semicrystalline thermoplastic film, and the third semicrystalline thermoplastic film allows for each respective film to sustain various environmental conditions. The semicrystalline nature further provides necessary strength and solvent resistance for each layer. In one or more examples, the degree of crystallinity is the same in each respective film. In one or more examples, the degree of crystallinity is different in one or more of each film. In one or more examples, the degree of crystallinity in the first semicrystalline thermoplastic film, the second semicrystalline thermoplastic film, and the third semicrystalline thermoplastic film ranges from about 5% crystalline to about 35% crystalline. In one or more examples, the degree of crystallinity in the first semicrystalline thermoplastic film, the second semicrystalline thermoplastic film, and the third semicrystalline thermoplastic film ranges from about 10% crystalline to about 30% crystalline. In one or more examples, the degree of crystallinity in the first semicrystalline thermoplastic film, the second semicrystalline thermoplastic film, and the third semicrystalline thermoplastic film ranges from about 15% crystalline to about 30% crystalline.

Figure 3:
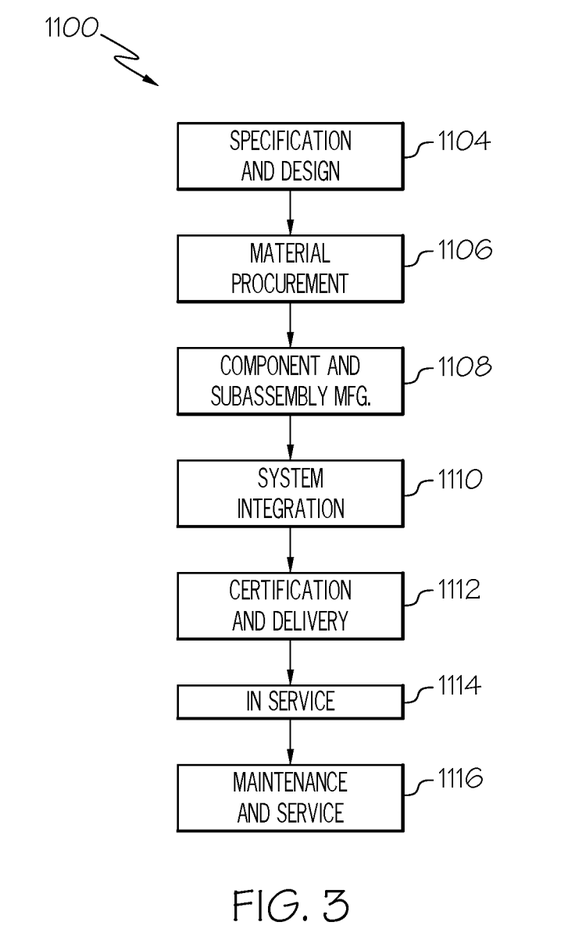
FIG. 3 is a block diagram of aircraft production and service methodology.
Figure 4:
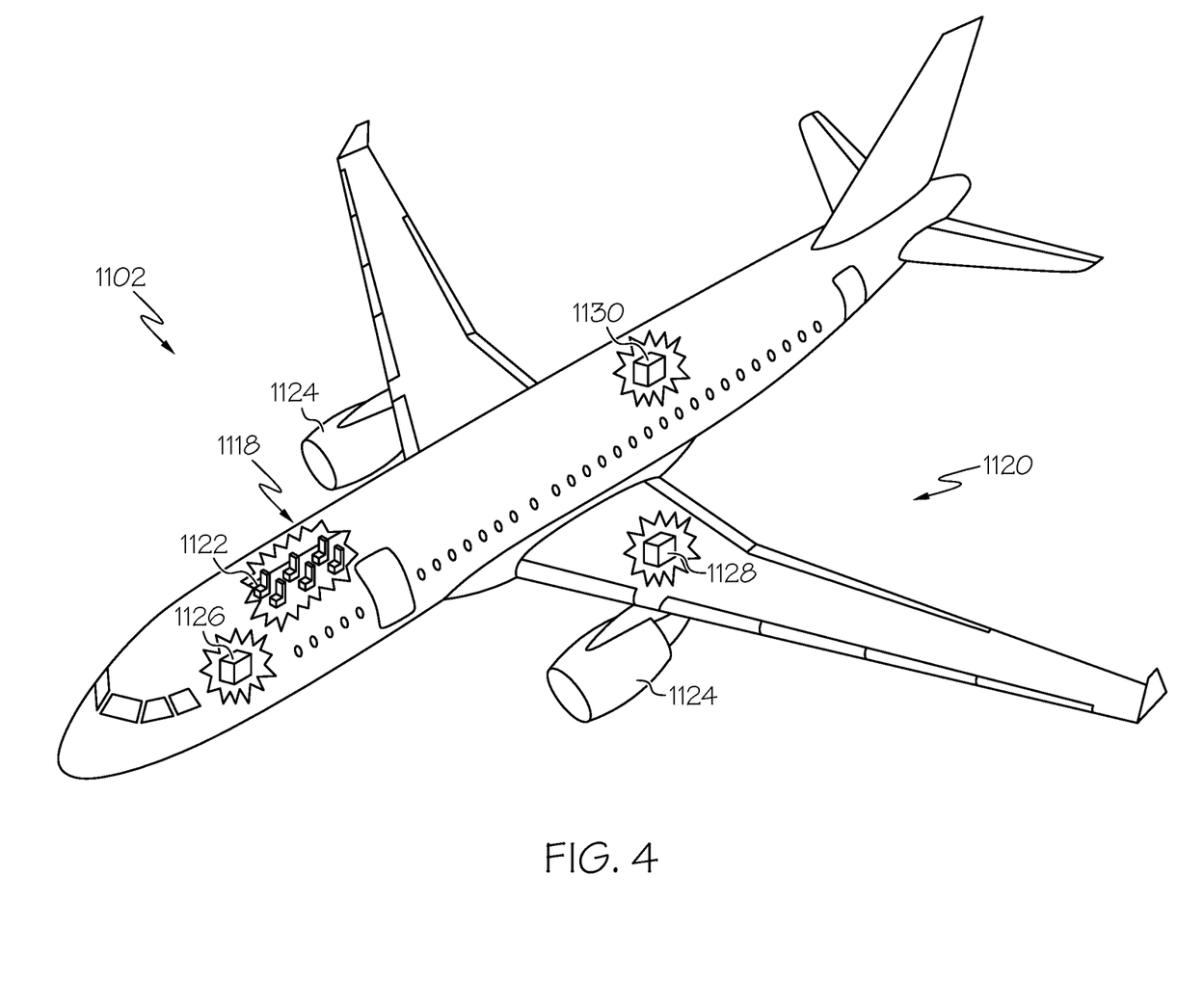
FIG. 4 is a schematic illustration of an aircraft.

Referring to FIG. 3 and FIG. 4, the disclosed method 100 and resulting stacked structure 275 will be used in the context of aircraft manufacturing and service including material procurement (block 1106), production, component and subassembly manufacturing (block 1108), and certification and delivery (block 1112) of aircraft 1102.

Examples of the subject matter, disclosed herein may be described in the context of aircraft manufacturing and service method 1100 as shown in FIG. 3 and aircraft 1102 as shown in FIG. 4. In one or more examples, the stacked structure 275 comprises a stringer assembly used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Further, the disclosure comprise examples according to the following clauses:

Clause 1. A method (100) for joining a first thermoplastic substrate (210) with a second thermoplastic substrate (220), the first thermoplastic substrate (210) and the second thermoplastic substrate (220) both comprising a polyaryletherketone material having a first melting temperature ($T_{M1}$), the method (100) comprising:
co-consolidating (110) a first semicrystalline thermoplastic film (215) with the first thermoplastic substrate (210) to yield a first co-consolidated structure (217), the first semicrystalline thermoplastic film (215) comprising a polyaryletherketone material having a second melting temperature ($T_{M2}$), the second melting temperature ($T_{M2}$) being less than the first melting temperature ($T_{M1}$), wherein the first semicrystalline thermoplastic film (215) defines a first bonding surface (219) of the first co-consolidated structure (217);
co-consolidating (120) a second semicrystalline thermoplastic film (225) with the second thermoplastic substrate (220) to yield a second co-consolidated structure (227), the second semicrystalline thermoplastic film (225) comprising a polyaryletherketone material having a third melting temperature ($T_{M3}$), the third melting temperature ($T_{M3}$) being less than the first melting temperature ($T_{M1}$), wherein the second semicrystalline thermoplastic film (225) defines a second bonding surface (229) of the second co-consolidated structure (227); and
fusing (150) the first bonding surface (219) of the first co-consolidated structure (217) to the second bonding surface (229) of the second co-consolidated structure (227).

Clause 2. The method (100) of Clause 1 wherein the second melting temperature ($T_{M2}$) and the third melting temperature ($T_{M3}$) are substantially the same.

Clause 3. The method (100) of Clause 1 or Clause 2 wherein a difference between the first melting temperature ($T_{M1}$) and the second melting temperature ($T_{M2}$) is at least 5° C. and a difference between the first melting temperature ($T_{M1}$) and the third melting temperature ($T_{M3}$) is at least 20° C.

Clause 4. The method (100) of any of Clauses 1-3 wherein a difference between the first melting temperature ($T_{M1}$) and the second melting temperature ($T_{M2}$) is at least 10° C. and a difference between the first melting temperature ($T_{M1}$) and the third melting temperature ($T_{M3}$) is at least 25° C.

Clause 5. The method (100) of any of Clauses 1-4 wherein a difference between the first melting temperature ($T_{M1}$) and the second melting temperature ($T_{M2}$) is at least 15° C. and a difference between the first melting temperature ($T_{M1}$) and the third melting temperature ($T_{M3}$) is at least 30° C.

Clause 6. The method (100) of any of Clauses 1-5 wherein a difference between the first melting temperature ($T_{M1}$) and the second melting temperature ($T_{M2}$) is at least 20° C. and a difference between the first melting temperature ($T_{M1}$) and the third melting temperature ($T_{M3}$) is at least 35° C.

Clause 7. The method (100) of any of Clauses 1-6 wherein a difference between the first melting temperature ($T_{M1}$) and the second melting temperature ($T_{M2}$) is at least 30° C. and a difference between the first melting temperature ($T_{M1}$) and the third melting temperature ($T_{M3}$) is at least 40° C.

Clause 8. The method (100) of any of Clauses 1-7 wherein the fusing (150) comprises heating (140) the first co-consolidated structure (217) and the second co-consolidated structure (227).

Clause 9. The method (100) of Clause 8 wherein the heating (140) comprises heating (140) the first co-consolidated structure (217) and the second co-consolidated structure (227) to a joining temperature, wherein the joining temperature is greater than the second melting temperature ($T_{M2}$) and the third melting temperature ($T_{M3}$), and less than the first melting temperature ($T_{M1}$).

Clause 10. The method (100) of Clause 8 or Clause 9 wherein the fusing (150) further comprises pressing (160) the first bonding surface (219) of the first co-consolidated structure (217) into engagement with the second bonding surface (229) of the second co-consolidated structure (227).

Clause 11. The method (100) of any of Clauses 8-10 wherein the heating (140) comprises conduction heating.

Clause 12. The method (100) of any of Clauses 1-11 wherein the first co-consolidated structure (217) has a first co-consolidating temperature $T_1$.

Clause 13. The method (100) of Clause 12 wherein the first co-consolidating temperature $T_1$ is greater than the first melting temperature $T_{M1}$.

Clause 14. The method (100) of Clause 12 or Clause 13 wherein the second co-consolidated structure (227) has a second co-consolidating temperature $T_2$.

Clause 15. The method (100) of Clause 14 wherein the second co-consolidating temperature $T_2$ is greater than the first melting temperature $T_{M1}$.

Clause 16. The method (100) of any of Clauses 1-15 further comprising, prior to the fusing, positioning (130) a third semicrystalline thermoplastic film (230) between and in contact with both the first bonding surface (219) of the first co-consolidated structure (217) and the second bonding surface (229) of the second co-consolidated structure (227), the third semicrystalline thermoplastic film (230) comprising a polyaryletherketone material having a fourth melting temperature ($T_{M4}$).

Clause 17. The method (100) of Clause 16 wherein the fourth melting temperature ($T_{M4}$) is substantially the same as the second melting temperature ($T_{M2}$) and the third melting temperature ($T_{M3}$).

Clause 18. The method (100) of Clause 16 or Clause 17 wherein the third semicrystalline thermoplastic film (230) comprises polyether ether ketone.

Clause 19. The method (100) of Clause 16 or Clause 17 wherein the third semicrystalline thermoplastic film (230) comprises polyether ketone ketone.

Clause 20. The method (100) of Clause 16 of Clause 17 wherein the third semicrystalline thermoplastic film (230) comprises a blend of polyether ketone ketone and polyether ether ketone.

Clause 21. The method (100) of any of Clauses 1-20 wherein the first thermoplastic substrate (210) and the second thermoplastic substrate (220) comprise polyether ether ketone.

Clause 22. The method (100) of Clause 21 wherein first semicrystalline thermoplastic film (215) and the second semicrystalline thermoplastic film (225) comprise polyether ether ketone.

Clause 23. The method (100) of any of Clauses 1-22 wherein the first thermoplastic substrate (210) and the second thermoplastic substrate (220) comprise polyether ketone ketone.

Clause 24. The method (100) of any of Clauses 1-23 wherein the co-consolidating (110) the first semicrystalline thermoplastic film (215) with the first thermoplastic substrate (210) and the co-consolidating (120) the second semicrystalline thermoplastic film (225) with the second thermoplastic substrate (220) are performed at a temperature between about 300° C. and about 420° C.

Clause 25. The method (100) of any of Clauses 1-24 wherein the fusing (150) comprises heating (140) and pressing (160).

Clause 26. The method (100) of any of Clauses 1-25 wherein the fusing (150) is performed at a temperature between about 260° C. and about 350° C.

Clause 27. The method (100) of any of Clauses 1-26 wherein the fusing (150) is performed at a temperature between about 299° C. and about 350° C.

Clause 28. The method (100) of any of Clauses 1-27 wherein the fusing (150) comprises applying pressure to at least one of the first thermoplastic substrate (210) and the second thermoplastic substrate (220).

Clause 29. The method (100) of any of Clauses 1-28 wherein the fusing (150) comprises applying pressure with a pressure vessel.

Clause 30. The method (100) of any of Clauses 1-29 wherein the fusing (150) comprises applying pressure with an inflatable bladder at about 14 psi to about 60 psi.

Clause 31. The method (100) of any of Clauses 1-30 wherein the fusing (150) comprises applying pressure with an autoclave.

Clause 32. The method (100) of any of Clauses 1-31 wherein the fusing (150) comprises applying pressure with a vacuum.

Clause 33. A method (100) for joining a first thermoplastic substrate (210) with a second thermoplastic substrate (220), the first thermoplastic substrate (210) and the second thermoplastic substrate (220) both comprising a polyaryletherketone material having a first melting temperature ($T_{M1}$), the method (100) comprising:

- co-consolidating (110) a first semicrystalline thermoplastic film (215) with the first thermoplastic substrate (210) to yield a first co-consolidated structure (217), the first semicrystalline thermoplastic film (215) comprising a polyaryletherketone material having a second melting temperature ($T_{M2}$), the second melting temperature ($T_{M2}$) being less than the first melting temperature ($T_{M1}$), wherein the first semicrystalline thermoplastic film (215) defines a first bonding surface (219) of the first co-consolidated structure (217);
- co-consolidating (120) a second semicrystalline thermoplastic film (225) with the second thermoplastic substrate (220) to yield a second co-consolidated structure (227), the second semicrystalline thermoplastic film (225) comprising a polyaryletherketone material having a third melting temperature ($T_{M3}$), the third melting temperature ($T_{M3}$) being less than the first melting temperature ($T_{M1}$), wherein the second semicrystalline thermoplastic film (225) defines a second bonding surface (229) of the second co-consolidated structure (227);
- positioning (130) a third semicrystalline thermoplastic film (230) between and in contact with both the first bonding surface (219) of the first co-consolidated structure (217) and the second bonding surface (229) of the second co-consolidated structure (227), the third semicrystalline thermoplastic film (230) comprising a polyaryletherketone material having a fourth melting temperature ($T_{M4}$);
- heating (140) the first bonding surface (219) of the first co-consolidated structure (217) and the second bonding surface (229) of the second co-consolidated structure (227); and
- pressing (160) the first bonding surface (219) of the first co-consolidated structure (217) into engagement with the second bonding surface (229) of the second co-consolidated structure (227).

Clause 34. The method (100) of Clause 33 wherein a difference between the first melting temperature ($T_{M1}$) and the second melting temperature ($T_{M2}$) is at least 5° C. and a difference between the first melting temperature ($T_{M1}$) and the third melting temperature ($T_{M3}$) is at least 20° C.

Clause 35. The method (100) of Clause 33 or Clause 34 wherein a difference between the first melting temperature ($T_{M1}$) and the second melting temperature ($T_{M2}$) is at least 10° C. and a difference between the first melting temperature ($T_{M1}$) and the third melting temperature ($T_{M3}$) is at least 25° C.

Clause 36. The method (100) of any of Clauses 33-35 wherein a difference between the first melting temperature ($T_{M1}$) and the second melting temperature ($T_{M2}$) is at least 15° C. and a difference between the first melting temperature ($T_{M1}$) and the third melting temperature ($T_{M3}$) is at least 30° C.

Clause 37. The method (100) of any of Clauses 33-36 wherein a difference between the first melting temperature ($T_{M1}$) and the second melting temperature ($T_{M2}$) is at least 20° C. and a difference between the first melting temperature ($T_{M1}$) and the third melting temperature ($T_{M3}$) is at least 35° C.

Clause 38. The method (100) of any of Clauses 33-37 wherein a difference between the first melting temperature ($T_{M1}$) and the second melting temperature ($T_{M2}$) is at least 30° C. and a difference between the first melting temperature ($T_{M1}$) and the third melting temperature ($T_{M3}$) is at least 40° C.

Clause 39. The method (100) of any of Clauses 33-38 wherein the fourth melting temperature ($T_{M4}$) is substantially the same as the second melting temperature ($T_{M2}$) and the third melting temperature ($T_{M3}$).

Clause 40. The method (100) of any of Clauses 33-39 wherein the third semicrystalline thermoplastic film (230) comprises polyether ether ketone.

Clause 41. The method (100) of any of Clauses 33-40 wherein the third semicrystalline thermoplastic film (230) comprises polyether ketone ketone.

Clause 42. The method (100) of any of Clauses 33-41 wherein the third semicrystalline thermoplastic film (230) comprises a blend of polyether ketone ketone and polyether ether ketone.

Clause 43. The method (100) of any of Clauses 33-42 wherein the first thermoplastic substrate (210) and the second thermoplastic substrate (220) comprise polyether ether ketone.

Clause 44. The method (100) of any of Clauses 33-43 wherein first semicrystalline thermoplastic film (215) and the second semicrystalline thermoplastic film (225) comprise polyether ether ketone.

Clause 45. The method (100) of any of Clauses 33-44 wherein the first thermoplastic substrate (210) and the second thermoplastic substrate (220) comprise polyether ketone ketone.

Clause 46. The method (100) of any of Clauses 33-45 wherein the co-consolidating (110) the first semicrystalline thermoplastic film (215) with the first thermoplastic substrate (210) and the co-consolidating (120) the second semicrystalline thermoplastic film (225) with the second thermoplastic substrate (220) are performed at a temperature between about 300° C. and about 420° C.

Clause 47. The method (100) of any of Clauses 33-46 wherein the first co-consolidated structure (217) has a first co-consolidating temperature $T_1$.

Clause 48. The method (100) of Clause 47 wherein the first co-consolidating temperature $T_1$ is greater than the first melting temperature ($T_{M1}$).

Clause 49. The method (100) of any of Clauses 33-48 wherein the second co-consolidated structure (227) has a second co-consolidating temperature ($T_2$).

Clause 50. The method (100) of Clause 49 wherein the second co-consolidating temperature ($T_2$) is greater than the first melting temperature ($T_{M1}$).

Clause 51. The method (100) of any of Clauses 33-50 wherein the heating (140) is performed at a temperature between about 260° C. and about 350° C.

Clause 52. The method (100) of any of Clauses 33-51 wherein the heating (140) is performed at a temperature between about 299° C. and about 350° C.

Clause 53. The method (100) of any of Clauses 33-52 wherein the pressing (160) comprises applying pressure with a pressure vessel.

Clause 54. The method (100) of any of Clauses 33-53 wherein the pressing (160) comprises applying pressure with an inflatable bladder at about 14 psi to about 60 psi.

Clause 55. The method (100) of any of Clauses 33-54 wherein the pressing (160) comprises applying pressure with an autoclave.

Clause 56. The method (100) of any of Clauses 33-55 wherein the pressing (160) comprises applying pressure with a vacuum.

Clause 57. A stacked structure (275) comprising:
a first co-consolidated structure (217) comprising:
a first thermoplastic substrate (210) comprising a polyaryletherketone material, said first thermoplastic substrate (210) having a first melting temperature ($T_{M1}$); and
a first semicrystalline thermoplastic film (215) comprising a polyaryletherketone material, said a first semicrystalline thermoplastic film (215) having a second melting temperature ($T_{M2}$) that is less than the first melting temperature ($T_{M1}$), wherein the first semicrystalline thermoplastic film (215) defines a first bonding surface (219) of the first co-consolidated structure (217); and
a second co-consolidated structure (227) comprising:
a second thermoplastic substrate (220) comprising a polyaryletherketone material, said second thermoplastic substrate (220) having a first melting temperature ($T_{M1}$); and
a second semicrystalline thermoplastic film (225) comprising a polyaryletherketone material, said second semicrystalline thermoplastic film (225) having a third melting temperature ($T_{M3}$) that is less than the first melting temperature ($T_{M1}$), wherein the second semicrystalline thermoplastic film (225) defines a second bonding surface (229) of the second co-consolidated structure (227).

Clause 58. The stacked structure (275) of Clause 57 wherein the first co-consolidated structure (217) has a first co-consolidating temperature $T_1$.

Clause 59. The stacked structure (275) of Clause 58 wherein the first co-consolidating temperature $T_1$ is greater than the first melting temperature ($T_{M1}$).

Clause 60. The stacked structure (275) of any of Clauses 57-59 wherein the second co-consolidated structure (227) has a second co-consolidating temperature ($T_2$).

Clause 61. The stacked structure (275) of Clause 60 wherein the second co-consolidating temperature ($T_2$) is greater than the first melting temperature ($T_{M1}$).

Clause 62. The stacked structure (275) of any of Clauses 57-61 wherein a difference between the first melting temperature ($T_{M1}$) and the second melting temperature ($T_{M2}$) is at least 5° C. and a difference between the first melting temperature ($T_{M1}$) and the third melting temperature ($T_{M3}$) is at least 20° C.

Clause 63. The stacked structure (275) of any of Clauses 57-62 wherein a difference between the first melting temperature ($T_{M1}$) and the second melting temperature ($T_{M2}$) is at least 10° C. and a difference between the first melting temperature ($T_{M1}$) and the third melting temperature ($T_{M3}$) is at least 25° C.

Clause 64. The stacked structure (275) of any of Clauses 57-63 wherein a difference between the first melting temperature ($T_{M1}$) and the second melting temperature ($T_{M2}$) is at least 15° C. and a difference between the first melting temperature ($T_{M1}$) and the third melting temperature ($T_{M3}$) is at least 30° C.

Clause 65. The stacked structure (275) of any of Clauses 57-64 wherein a difference between the first melting temperature ($T_{M1}$) and the second melting temperature ($T_{M2}$) is at least 20° C. and a difference between the first melting temperature ($T_{M1}$) and the third melting temperature ($T_{M3}$) is at least 35° C.

Clause 66. The stacked structure (275) of any of Clauses 57-65 wherein a difference between the first melting temperature ($T_{M1}$) and the second melting temperature ($T_{M2}$) is at least 30° C. and a difference between the first melting temperature ($T_{M1}$) and the third melting temperature ($T_{M3}$) is at least 40° C.

Clause 67. The stacked structure (275) of any of Clauses 57-66 wherein the second melting temperature ($T_{M2}$) and the third melting temperature ($T_{M3}$) are substantially the same.

Clause 68. The stacked structure (275) of any of Clauses 57-67 wherein the first thermoplastic substrate (210) and the second thermoplastic substrate (220) comprise polyether ether ketone.

Clause 69. The stacked structure (275) of any of Clauses 57-68 wherein first semicrystalline thermoplastic film (215)

and the second semicrystalline thermoplastic film (225) comprise polyether ether ketone.

Clause 70. The stacked structure (275) of any of Clauses 57-69 wherein the first thermoplastic substrate (210) and the second thermoplastic substrate (220) comprise polyether ketone ketone.

Clause 71. The stacked structure (275) of any of Clauses 57-70 further comprising a third semicrystalline thermoplastic film (230) disposed between and in contact with both the first bonding surface (219) of the first co-consolidated structure (217) and the second bonding surface (229) of the second co-consolidated structure (227), said third semicrystalline thermoplastic film (230) comprising a polyaryletherketone material and having a fourth melting temperature ($T_{M4}$).

Clause 72. The stacked structure (275) of Clause 71 wherein the fourth melting temperature ($T_{M4}$) is substantially the same as the second melting temperature ($T_{M2}$) and the third melting temperature ($T_{M3}$).

Clause 73. The stacked structure (275) of Clause 71 or Clause 72 wherein the third semicrystalline thermoplastic film (230) comprises polyether ether ketone.

Clause 74. The stacked structure (275) of Clause 71 or Clause 72 wherein the third semicrystalline thermoplastic film (230) comprises polyether ketone ketone.

Clause 75. The stacked structure (275) of Clause 71 or Clause 72 wherein the third semicrystalline thermoplastic film (230) comprises a blend of polyether ketone ketone and polyether ether ketone.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A method for joining a first multi-ply thermoplastic composite part with a second multi-ply thermoplastic composite part, the method comprising:

co-consolidating a first semicrystalline thermoplastic film with the first multi-ply thermoplastic composite part to yield a first co-consolidated structure, the first multi-ply thermoplastic composite part comprising a first polyaryletherketone material having a first melting temperature, the first semicrystalline thermoplastic film comprising a second polyaryletherketone material having a second melting temperature, the second melting temperature being less than the first melting temperature, wherein the first semicrystalline thermoplastic film defines a first bonding surface on a first side of the first co-consolidated structure;

co-consolidating a second semicrystalline thermoplastic film with the second multi-ply thermoplastic composite part to yield a second co-consolidated structure, the second multi-ply thermoplastic composite part comprising the first polyaryletherketone material, the second semicrystalline thermoplastic film comprising a third polyaryletherketone material having a third melting temperature, the third melting temperature being less than the first melting temperature, wherein the second semicrystalline thermoplastic film defines a second bonding surface on a second side of the second co-consolidated structure;

positioning the first co-consolidated structure and the second co-consolidated structure such that the first bonding surface is facing the second bonding surface; and fusing the first bonding surface on the first side of the first co-consolidated structure to the second bonding surface on the second side of the second co-consolidated structure to yield a semicrystalline film joined thermoplastic assembly.

2. The method of claim 1 wherein the second melting temperature and the third melting temperature are substantially the same.

3. The method of claim 1 wherein a difference between the first melting temperature and the second melting temperature is at least 5° C. and a difference between the first melting temperature and the third melting temperature is at least 20° C.

4. The method of claim 1 wherein a difference between the first melting temperature and the second melting temperature is at least 15° C. and a difference between the first melting temperature and the third melting temperature is at least 30° C.

5. The method of claim 1 wherein a difference between the first melting temperature and the second melting temperature is at least 30° C. and a difference between the first melting temperature and the third melting temperature is at least 40° C.

6. The method of claim 1 wherein the fusing comprises heating the first co-consolidated structure and the second co-consolidated structure.

7. The method of claim 6 wherein the heating comprises heating the first co-consolidated structure and the second co-consolidated structure to a joining temperature, wherein the joining temperature is greater than the second melting temperature and the third melting temperature, and less than the first melting temperature.

8. The method of claim 6 wherein the fusing further comprises pressing the first bonding surface of the first co-consolidated structure into engagement with the second bonding surface of the second co-consolidated structure.

9. The method of claim 1 wherein the first co-consolidated structure has a first co-consolidating temperature, and wherein the first co-consolidating temperature is greater than the first melting temperature.

10. The method of claim 1 wherein the second co-consolidated structure has a second co-consolidating temperature, and wherein the second co-consolidating temperature is greater than the first melting temperature.

11. The method of claim 1 further comprising, prior to the fusing, positioning a third semicrystalline thermoplastic film between and in contact with both the first bonding surface of the first co-consolidated structure and the second bonding surface of the second co-consolidated structure, the third semicrystalline thermoplastic film comprising a fourth polyaryletherketone material having a fourth melting temperature.

12. The method of claim 11 wherein the third semicrystalline thermoplastic film comprises a blend of polyether ketone ketone and polyether ether ketone.

13. The method of claim 1 wherein the first multi-ply thermoplastic composite part and the second multi-ply thermoplastic composite part comprise polyether ether ketone.

14. The method of claim 13 wherein the first semicrystalline thermoplastic film and the second semicrystalline thermoplastic film comprise polyether ether ketone.

15. The method of claim 1 wherein the first multi-ply thermoplastic composite part and the second multi-ply thermoplastic composite part comprise polyether ketone ketone.

16. The method of claim 1 wherein the co-consolidating the first semicrystalline thermoplastic film with the first multi-ply thermoplastic composite part and the co-consolidating the second semicrystalline thermoplastic film with the second multi-ply thermoplastic composite part are performed at a temperature between about 300° C. and about 420° C.

17. The method of claim 1 wherein the fusing comprises heating and pressing.

18. The method of claim 1 wherein the fusing is performed at a temperature between about 260° C. and about 350° C.

19. The method of claim 1 wherein the fusing is performed at a temperature between about 299° C. and about 350° C.

20. The method of claim 1 wherein the fusing comprises applying pressure to at least one of the first multi-ply thermoplastic composite part and the second multi-ply thermoplastic composite part.

21. The method of claim 1 wherein the fusing comprises applying pressure with an inflatable bladder at about 14 psi to about 60 psi.

22. The method of claim 1 wherein:
a degree of crystallinity in the first semicrystalline thermoplastic film ranges from above 20% crystalline to about 35% crystalline, and
a degree of crystallinity in the second semicrystalline thermoplastic film ranges from above 20% crystalline to about 35% crystalline.

23. A method for joining a first multi-ply thermoplastic composite part with a second multi-ply thermoplastic composite part, the method comprising:
co-consolidating a first semicrystalline thermoplastic film with the first multi-ply thermoplastic composite part to yield a first co-consolidated structure, the first multi-ply thermoplastic composite part comprising a first polyaryletherketone material having a first melting temperature, the first semicrystalline thermoplastic film comprising a second polyaryletherketone material having a second melting temperature, the second melting temperature being less than the first melting temperature, wherein the first semicrystalline thermoplastic film defines a first bonding surface on a first side of the first co-consolidated structure;
co-consolidating a second semicrystalline thermoplastic film with the second multi-ply thermoplastic composite part to yield a second co-consolidated structure, the second multi-ply thermoplastic composite part comprising the first polyaryletherketone material, the second semicrystalline thermoplastic film comprising a third polyaryletherketone material having a third melting temperature, the third melting temperature being less than the first melting temperature, wherein the second semicrystalline thermoplastic film defines a second bonding surface on a second side of the second co-consolidated structure;
positioning the first co-consolidated structure and the second co-consolidated structure such that the first bonding surface is facing the second bonding surface;
positioning a third semicrystalline thermoplastic film between and in contact with both the first bonding surface of the first co-consolidated structure and the second bonding surface of the second co-consolidated structure, the third semicrystalline thermoplastic film comprising a fourth polyaryletherketone material having a fourth melting temperature;
heating the first bonding surface on the first side of the first co-consolidated structure and the second bonding surface on the second side of the second co-consolidated structure; and
pressing the first bonding surface on the first side of the first co-consolidated structure into engagement with the second bonding surface on the second side of the second co-consolidated structure to yield a semicrystalline film joined thermoplastic assembly.

24. The method of claim 23 wherein:
a degree of crystallinity in the first semicrystalline thermoplastic film ranges from above 20% crystalline to about 35% crystalline, and
a degree of crystallinity in the second semicrystalline thermoplastic film ranges from above 20% crystalline to about 35% crystalline.

\* \* \* \* \*